(12) United States Patent
Kobres

(10) Patent No.: US 9,053,475 B2
(45) Date of Patent: Jun. 9, 2015

(54) TECHNIQUES FOR AUTOMATING SELF-SERVICE TRANSACTIONS

(75) Inventor: Erick Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 115 days.

(21) Appl. No.: 13/285,120

(22) Filed: Oct. 31, 2011

(65) Prior Publication Data

US 2013/0110654 A1 May 2, 2013

(51) Int. Cl.
G06Q 20/00 (2012.01)
G06Q 20/20 (2012.01)
G06Q 20/32 (2012.01)

(52) U.S. Cl.
CPC ............. *G06Q 20/204* (2013.01); *G06Q 20/20* (2013.01); *G06Q 20/3276* (2013.01)

(58) Field of Classification Search
USPC ........... 705/14, 16, 23, 26.41, 14.66; 235/375
See application file for complete search history.

(56) References Cited

U.S. PATENT DOCUMENTS

| 7,644,039 | B1 * | 1/2010 | Magee et al. | 705/43 |
| 2008/0313062 | A1 * | 12/2008 | Williams et al. | 705/35 |
| 2011/0251892 | A1 * | 10/2011 | Laracey | 705/16 |
| 2012/0030583 | A1 * | 2/2012 | DiPietro | 715/745 |
| 2012/0095853 | A1 * | 4/2012 | von Bose et al. | 705/16 |

* cited by examiner

Primary Examiner — Hunter Wilder
(74) Attorney, Agent, or Firm — Joseph P. Mehrle

(57) ABSTRACT

Techniques for automated transactions are provided. A customer uses a mobile device to interact with a self-service checkout device (SSCO) to perform a transaction. Initially, a unique barcode for the transaction is generated and displayed to the customer, via an attract screen of the SSCO. The mobile device scans the barcode (can be a QR code); this causes the mobile device to communicate with a remote server that identifies the customer. Preferences for the customer are retrieved and the transaction and features of the SSCO are configured based on the preferences. The transaction proceeds with the configured preferences.

17 Claims, 4 Drawing Sheets

TECHNIQUES FOR AUTOMATING SELF-SERVICE TRANSACTIONS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

So, increasingly customers are engaging in a variety of technologies to automatically interact with enterprises to perform transactions. The transactions may result in purchases or may result in such things as registration for loyalty programs, enrolling in promotional events, requesting additional information for a good or service, and others. That is, the transactions via these kiosks are not strictly tied to purchases although some transactions are purchase related.

One problem with the variety of existing mechanisms used to interact with customers is that often the customers are required to enter a variety of identifying information or other information before a transaction can complete. Each mechanism may also have its own interface screens and requirements. This can be time consuming and can deter customers from participating in automation with an enterprise because customers are often driven by ease of use associated with the automation and because customers want automated transactions to be seamless and quick.

SUMMARY

In various embodiments, techniques for automating self-service transactions with an enterprise are presented. According to an embodiment, a method for an automated self-service transaction with an enterprise system is provided.

Specifically, a customer identifier for a customer and a mobile device identifier for a mobile device of the customer are received for registration. Next, customer profile data for the customer is obtained and then a mobile device token to uniquely identify the mobile device and the customer is generated. Finally, the mobile device token is sent to the mobile device for use with custom transactions at a self-service checkout.

DETAILED DESCRIPTION

Figure 1:
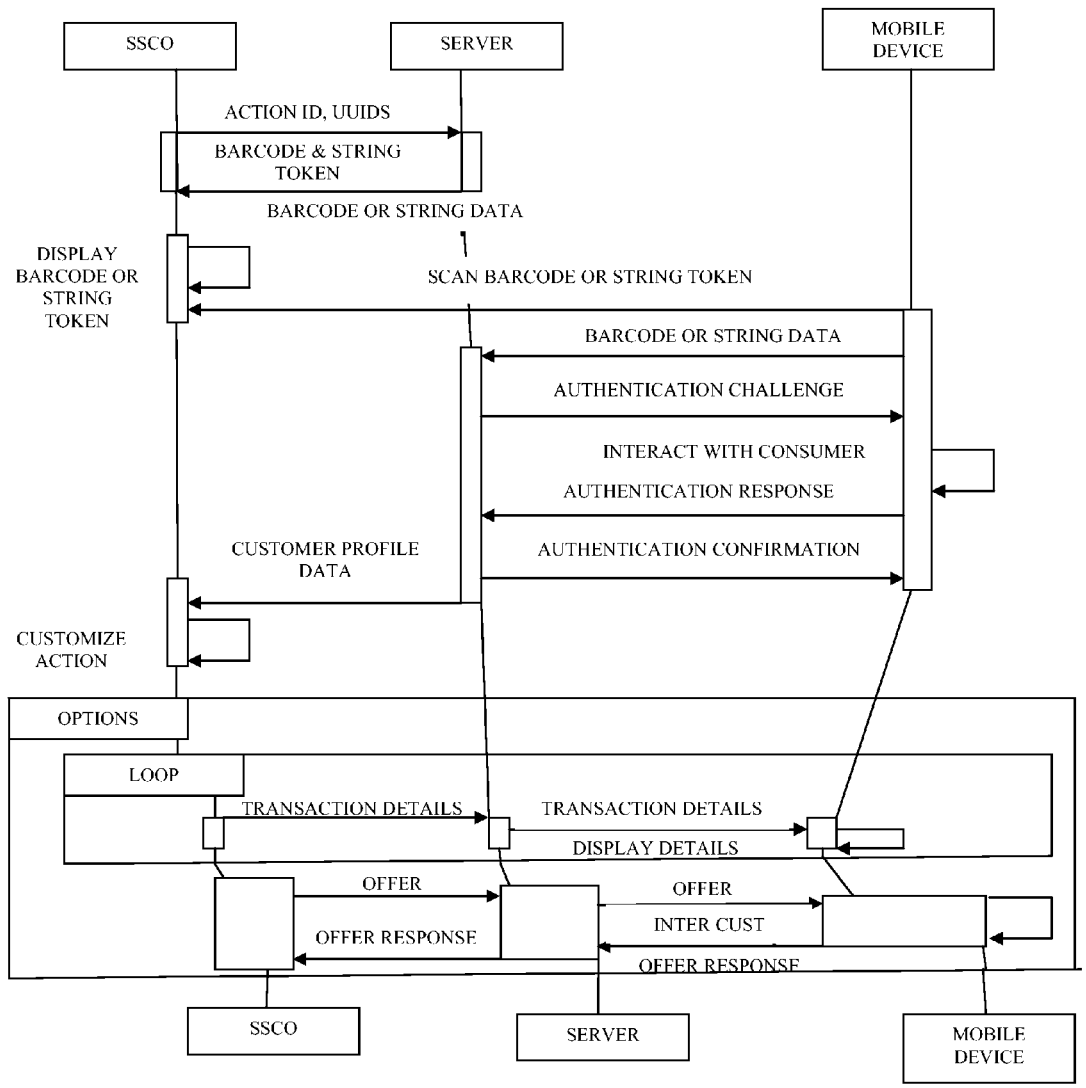
FIG. 1 is a flow diagram for automating a self-service transaction with an enterprise system, according to an example embodiment.

FIG. 1 is a flow diagram for automating a self-service transaction with an enterprise system, according to an example embodiment. The components of the diagram are implemented in non-transitory computer-readable storage medium for execution on one or more processing devices that are configured to execute the components. The components are also enabled to operate and communicate with one another over a network. The network can be wired, wireless, or a combination of wired and wireless.

It is noted that the components and the interactions of the components shown in the FIG. 1 are presented for illustrative purposes in a sample scenario with a sample enterprise system. So, other arrangements and interactions of the components are possible without departing from the beneficial teachings presented herein and below.

As will be more fully explained herein and below, the techniques and embodiments presented below provide a novel mechanism for automating self-service transaction by enabling automated configuration of consumer information into a self-service checkout without interaction by the consumer.

A Self-Service Checkout (SSCO) terminal presents a two dimensional (2D) barcode to the consumer (as used herein and below a barcode also includes a Quick Response (QR code); the customer scans the barcode with their mobile device (such as a mobile phone, tablet, personal digital assistant, etc.), accomplishing the same end result—that links a current transaction with the consumer's loyalty account. This also establishes a link between the consumer's mobile device and the transaction—such that the mobile device can be used as a User Interface (UI) to allow the customer (the terms "customer," "consumer," and "user" may be used interchangeably and synonymously herein) to answer questions, redeem points, receive electronic receipts or transaction records, receive target offers, and the like, via their mobile device.

The linkage is achieved by: a registration token previously provided by a retailer and securely stored on the mobile device and perhaps signed by the retailer, the mobile device, and/or the consumer for security; the customer's mobile phone number; and/or Media Access Control (MAC) identifier for the mobile device being preregistered with the customer's loyalty account. It is noted that multiple registration tokens, phone numbers, and/or MAC addresses can be registered with a same loyalty account. This may be particularly useful for a household having multiple members sharing a loyalty account and for customers that utilize a variety of mobile devices.

So, initially before a transaction begins with a customer, the SSCO System securely communicates over a network (Internet, cell, satellite, Wide Area, Local Area, and others) with a preference configuring service with a transaction Identifier (ID), unique location ID for the SSCO system and any other relevant information about the transaction.

The preference configuring service returns a barcode and string data containing a portal Uniform Resource Locator (URL) or Uniform Resource Identifier (URI) link along with the unique transaction ID, which can be digitally signed with a private key of the retailer for added security. It is noted that a barcode is an encoded version of string data. So, the preference configuring service returns some encoded data to the SSCO system and the exact format can be configurable to what is supported or what is desired on the SSCO system.

The SSCO system displays the barcode to the customer via a SSCO display (on a display of an automated self-service checkout terminal (such as an attract screen), on a digital sign, Automated Teller Machine, etc.); loads NFC data or otherwise presents the barcode or string such that the consumer's mobile device can acquire the string. So, if NFC communications are enabled string data is pushed to the mobile device of the customer by the SSCO system and automatically processed and optionally displayed on the customer's mobile device.

The SSCO system contacts the preference configuring service and enters a state of abeyance, awaiting loyalty information and/or profile/preference data. In other words, the SSCO system acquired a unique barcode from the preference configuring service for a unique transaction that is about to occur and then waits until the SSCO system hears back from the preference configuring service with the loyalty and/or profile/preference data from a specific customer that is to engage in the transaction with the SSCO system.

Next, a consumer approaches the SSCO system and acquires the barcode having the URL/URI string (used to contact the preference configuring service). Acquisition can occur by using a barcode scanner on the consumer's mobile device to scan the barcode off a display of the SSCO system or can occur via a NFC tap or other mechanism.

An application (app) on the mobile device then automatically contacts the preference configuring service via a secure connection, either through existing Over-The-Air (OTA) data connection, WiFi, Short Message Service (SMS) or other mechanism by presenting the string. It is noted that an existing app on the mobile device can provide the connection or a specialized app can be automatically downloaded and installed on the mobile device if upon contacting the preference configuring service it is detected that one is needed and missing from the mobile device.

Optionally and in some embodiments, the consumer also authenticates, via his/her mobile device with a secret, such as a Personal Identification Number (PIN), secure element token, biometrics or other mechanism. Such authentication can be configured based on the preference configuring service, the enterprise associated with the SSCO system, and/or the customer. So, there may be no authentication required for some SSCO systems, different authentication mechanisms for different SSCO systems, or a same authentication mechanism based on a specific consumer.

Once the presence of a specific consumer is established (done via registration token (signed or unsigned), the phone number of the mobile device, a MAC address for the mobile device, and/or any authentication mechanism used), the preference configuring service returns loyalty and/or preference/profile data for the specific consumer to the SSCO system, which is waiting for this new transaction to begin with the preference configuring service. It is noted that while the SSCO waits it may also be performing other operations, such as administrative or processing other existing transactions that have yet to complete. In fact, in some cases for efficiency the SSCO system may buffer some predefined number of unique transaction codes that it obtains as soon as an existing transaction completes.

Optionally and in an embodiment, a communication session between the mobile device and the SSCO system can be used for further interactions on the mobile device related to transacting, such as tendering, coupon redemption, points redemption, etc. during the transaction.

In another case, the SSCO system sends transaction details during or at the end of the transaction to other third-party services, the preference configuring service, and/or the mobile device. This may permit further interaction with the mobile device for related activities or may even provide receipt details to the mobile device (thereby avoiding any paper printing).

In some cases, the mobile device can maintain a connection to the preference configuring service to receive transaction updates, an electronic receipt or other information related to the transaction.

The FIG. 1 shows a sample flow of the description provided above, where the "Server" refers to the preference configuring service discussed above and below.

Figure 2:
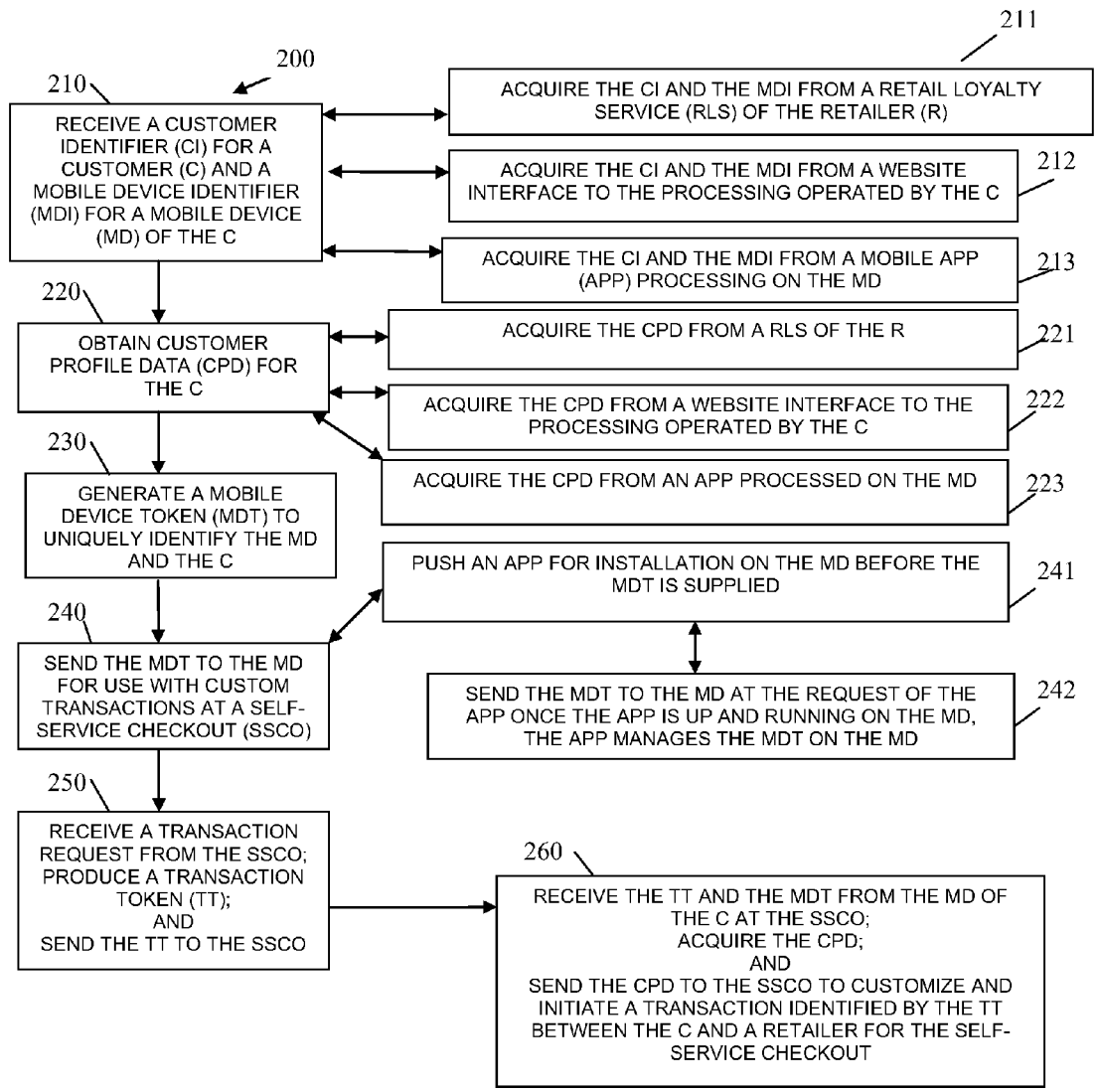
FIG. 2 is a diagram of a method for automating a self-service transaction with an enterprise system, according to an example embodiment.

FIG. 2 is a diagram of a method 200 for an automated transaction with an enterprise system, according to an example embodiment. The method 200 (hereinafter "preference configuring service") is implemented as instructions programmed and residing on a non-transitory computer-readable (processor-readable) storage medium and executed by one or more processors. The processors are specifically configured and programmed to process the preference configuring service. The preference configuring service operates over a network. The network is wired, wireless, or a combination of wired and wireless.

The preference configuring service executes on one or more processors of a server. In some embodiments, the preference configuring service operates in a cloud processing environment and is available as a cloud service over the Internet to enterprises and consumers.

The processing of the preference configuring service interacts with consumer mobile device apps, applications and services of enterprise SSCO systems, and/or other third-party services utilized by consumers and/or enterprises for transaction processing, loyalty processing, and/or other customer relationship management processing.

At 210, the preference configuring service receives a customer identifier for a customer and a mobile device identifier for a mobile device of the customer. Receipt of the customer identifier can occur in a variety of manners.

For example, at 211, the preference configuring service acquires the customer identifier and the mobile device identifier from a retail loyalty service of the retailer. That is the customer permits, via a registration process with the retailer's loyalty service, the retailer's loyalty service to communicate with the preference configuring service and register the customer and the customer's mobile device with the preference configuring service.

In another case, at 212, the preference configuring service acquires the customer identifier and the mobile device identifier from a website interface of the preference configuring service and the website interface being interacted with or operated by the customer. This can occur via a different device of the customer that is different from the mobile device or it can occur via the mobile device using a browser application of the mobile device.

In still another situation, at 213, the preference configuring service acquires the customer identifier and the mobile device identifier from a mobile app processing on the mobile device. Here, the mobile app is downloaded and installed on the mobile device and interaction with the customer occurs via that mobile app.

At 220, the preference configuring service obtains customer profile data for the customer. Customer profile data includes a variety of information, such as and by way of example only, payment information, receipt delivery preferences (via email, via text, via a printout, etc.), loyalty account, and/or features of the interface that is used by the self-service checkout. These features can include such things as text size, spoken language, voice prompts, voice input, and the like.

These features are specific preferences of the customer. Acquisition of the preference data can also occur in a variety of manners.

For example, at 221, the preference configuring service acquires the customer preference data from a retail loyalty service of the retailer. Again, this can be done with customer permission to the retailer or to the preference configuring service. That is, the customer's interactions with the retailer and its retail loyalty service can drive delivery of the customer preference data to the preference configuring service. Alternatively, the customer's interactions with the preference configuring service can permit the preference configuring service to request and obtain the preference data from the retail loyalty service.

In another situation, at 222, the preference configuring service acquires the customer preference data from a website interface to the preference configuring service, which is interacted with or operated by the customer.

In still another case, at 223, the preference configuring service acquires the customer preference data from a mobile app that is processing on the mobile device. This situation was discussed above with reference to the embodiment of 213.

At 230, the preference configuring service generates a mobile device token to uniquely identify the mobile device and the customer. That is, the mobile device token is an encrypted security token that the preference configuring service ties or maps to the customer and the customer's preference data for subsequent use, discussed herein and below.

At 240, the preference configuring service sends the mobile device token to the mobile device for use with custom transactions at a self-service checkout of the retailer.

In an embodiment, at 241, the preference configuring service pushes a mobile app for installation on the mobile device before the mobile device token is supplied. Processing details associated with the mobile app are presented below with reference to the FIG. 3.

Continuing with the embodiment of 241 and at 242, the preference configuring service sends the mobile device token to the mobile device at the request of the mobile app once the mobile app is up and running on the mobile device. The mobile app securely manages the mobile device token on the mobile device.

According to an embodiment, at 250, the preference configuring service receives a transaction request from the self-service checkout. In response, the preference configuring service produces a transaction token that uniquely identifies a new transaction that is about to process on the self-service checkout. Then, the preference configuring service sends the transaction token to the self-service checkout.

In another situation of 250 and at 260, the preference configuring service receives the transaction token a second time and the mobile device token from the mobile device of the customer, who is at the self-service checkout. Next, the preference configuring service acquires the customer preference data and then sends the customer profile data to the self-service checkout for purposes of customizing and initiating the new transaction, which is identified by the transaction token, between the customer and the retailer for the self-service checkout.

Figure 3:
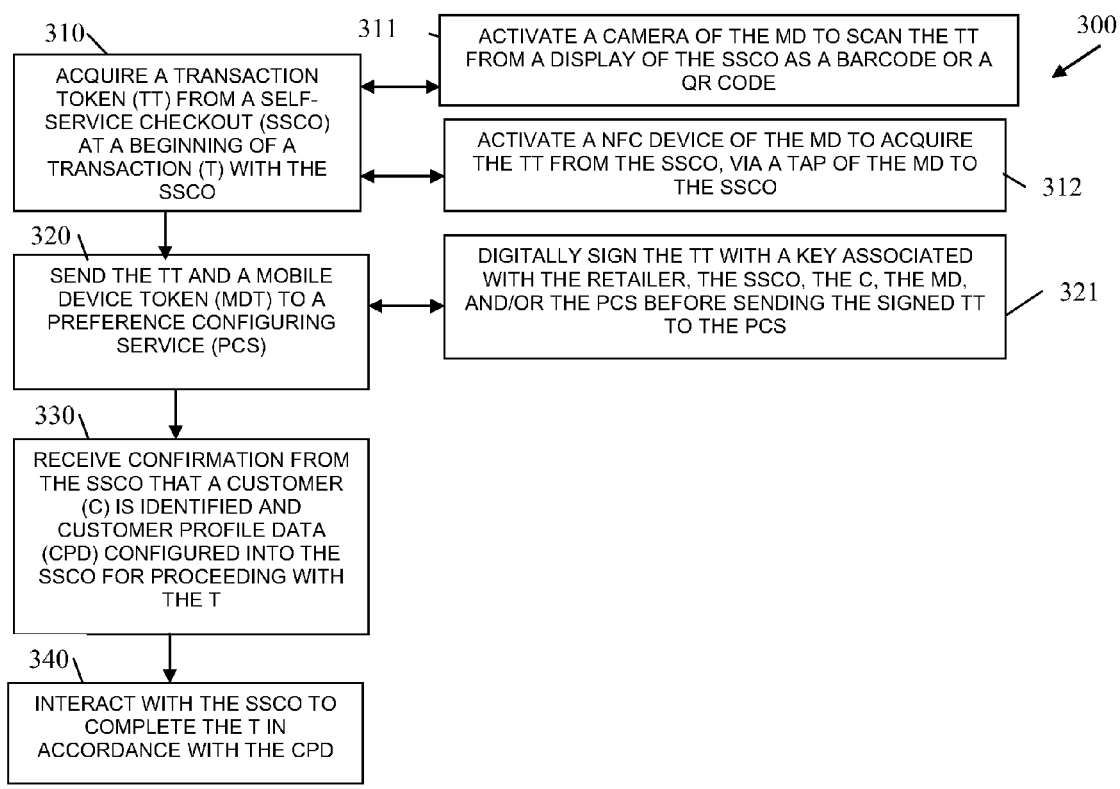
FIG. 3 is a diagram of another method for automating a self-service transaction with an enterprise system, according to an example embodiment.

FIG. 3 is a diagram of another method 300 for an automated transaction with an enterprise system, according to an example embodiment. The method 300 (hereinafter "mobile app") is implemented as instruction and programmed within a non-transitory computer-readable (processor-readable) storage medium that executes on one or more processors of a mobile device (e.g., mobile phone, personal digital assistant (PDA), tablet, laptop, etc.); the processors of the mobile device are specifically configured to execute the mobile app. The mobile app is operational over a network; the network is wired, wireless, or a combination of wired and wireless.

The mobile app is controlled by a consumer (customer and/or user) and interacts with the preference configuring service, represented by the method 200 of the FIG. 2 and also interacts with an enterprise SSCO system (discussed below with reference to the FIG. 4).

It is noted that the mobile app can be installed and initiated by the consumer on the mobile device in a variety of manners before the processing occurs as detailed below. For instance, in one situation during a registration process of the mobile device with a preference configuring service (such as the one discussed above with reference to the FIG. 2), the mobile app is downloaded and initiated on the mobile device. In another instance, during an initial contact by the mobile device by activating a QR code for a first time that represents a unique transaction code for a retailer, the preference configuring service is automatically contacted and downloads and installs on the mobile device and initiates a registration process. The remaining processing described for the mobile app assumes the mobile app is installed and executing on a mobile device of a consumer.

At 310, the mobile app acquires a transaction token from a self-service checkout at a beginning of a transaction with the self-service checkout. This can occur in a few automated ways.

For example, at 311, the mobile app activates a camera of the mobile device to scan the transaction token from a display of the self-service checkout as a barcode or QR code.

In another case, at 312, the mobile app activates a NFC device of the mobile device to acquire the transaction token from the self-service checkout, via a tap of the mobile device to the self-service checkout.

At 320, the mobile app sends the transaction token and a mobile device token to a preference configuring service. The manner in which the transaction token is initially acquired and managed on the mobile device was discussed above with reference to the FIG. 2.

According to an embodiment, at 321, the mobile app digitally signs the transaction token with a key associated with the retailer, the self-service checkout, the customer, the mobile device, the preference configuring service, various combinations of these entities, or all these entities.

At 330, the mobile app receives confirmation from the self-service checkout that a customer is identified and customer profile data is configured into the self-service checkout for the customer to proceed/commence with the transaction.

In an embodiment, at 340, the mobile app interacts with the self-service checkout to complete the transaction in accordance with or according to the dictates defined in the customer preference data.

Figure 4:
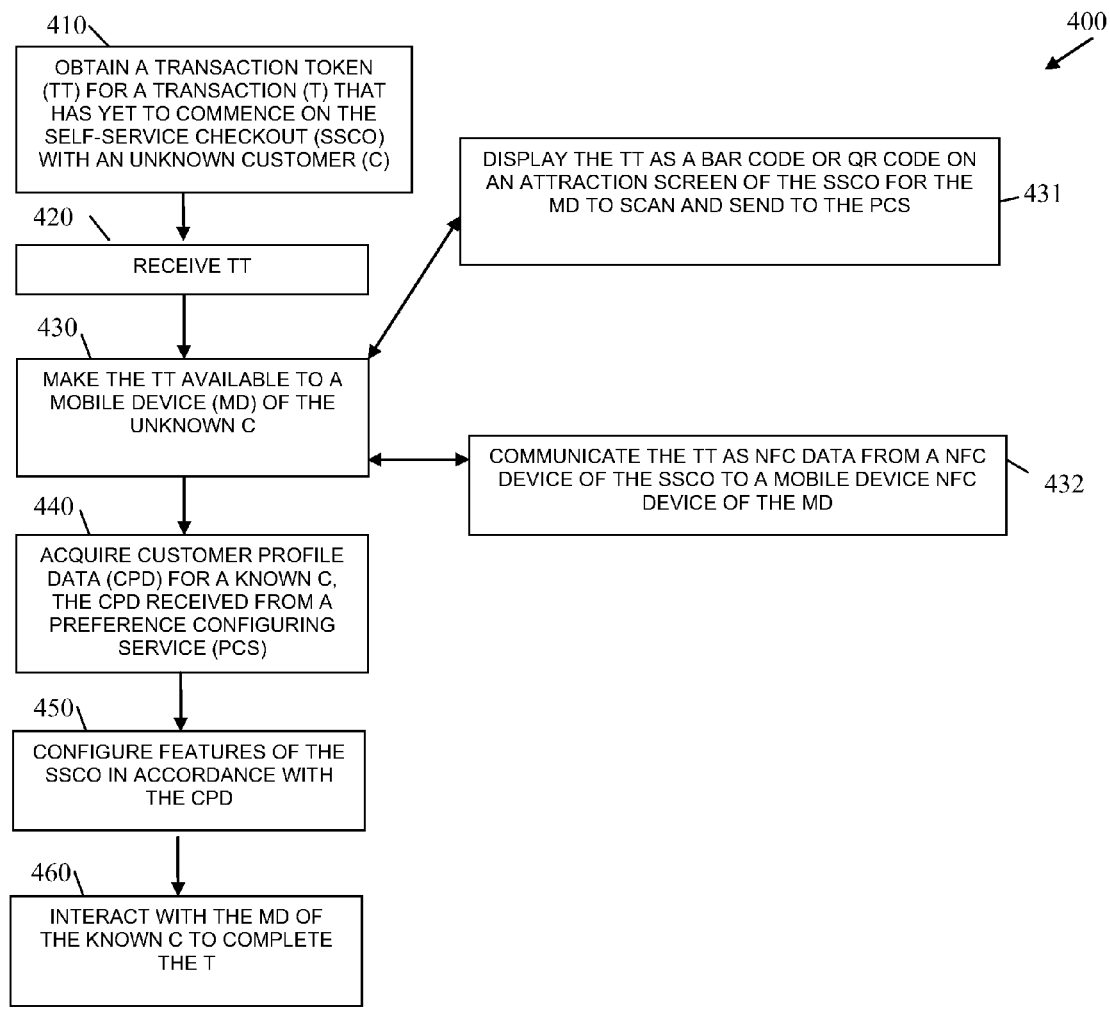
FIG. 4 is a diagram of yet another method for an automating a self-service transaction with an enterprise system, according to an example embodiment.

FIG. 4 is a diagram of yet another method 400 for an automated transaction with an enterprise system, according to an example embodiment. The method 300 (hereinafter "self-service checkout app") is implemented as executable instructions and programmed within a non-transitory computer-readable (processor-readable) storage medium that executes on one or more processors of a self-service checkout device e.g., self-service kiosk, Automated Teller Machine (ATM), etc.); the processors of the self-service checkout app are specifically configured to execute the self-service checkout app. The self-service checkout app is operational over a network; the network is wired, wireless, or a combination of wired and wireless.

The FIG. 1 described the processing for automating a self-service checkout transaction as a whole. The FIG. 2 described the processing from the perspective of the preference configuring service; the FIG. 3 described the processing from the perspective of the consumer's mobile app on a consumer's mobile device; and the self-service checkout app of the FIG. 4 describes the processing from an enterprise's SSCO system processing on a self-service checkout device. A transaction process is automated and customized via the interaction among the preference configuring service (of the FIG. 2), the mobile app (of the FIG. 3), and the self-service checkout app (of the FIG. 4).

At 410, the self-service checkout app obtains a transaction token for a transaction that has yet to commence on a self-service checkout. The transaction is yet to commence with a as of yet unknown customer. A variety of information can be included with the transaction token, such as but not limited to, a date, a time, a geographical location, a store identifier, a self-service checkout identifier, a retailer identifier, and the like.

At 420, the self-service checkout app receives the transaction token.

At 430, the self-service checkout app makes the transaction token available to a mobile device of the as of yet unknown customer.

According to an embodiment, at 431, the self-service checkout app displays the transaction token as a barcode or QR code on an attraction screen of the self-service checkout for the mobile device to scan and then send to the preference configuring service.

In another case, at 432, the self-service checkout app communicates the transaction token as NFC data from a NFC device of the self-service checkout to a mobile device NFC device of the mobile device.

At 440, the self-service checkout app acquires customer profile data for a now known customer. The customer profile data received from the preference configuring service. The customer profile data identifies a specific customer for the retailer associated with the self-service checkout.

At 450, the self-service checkout app configures features of the self-service checkout in accordance with or using directives defined in the customer preference data. Example configurations that can occur were presented above with reference to the FIGS. 1-3.

According to an embodiment, at 460, the self-service checkout app interacts with the mobile device of the known customer to complete the transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a server configured to execute the method, comprising:
   receiving, at the server, a customer identifier for a customer and a mobile device identifier for a mobile device of the customer;
   obtaining, at the server, customer profile data for the customer, the customer profile data including payment information, receipt delivery preferences for the customer, a loyalty account for the customer, and features for use by a self-service checkout, wherein the features include text size, spoken language and voice prompts and the customer profile data is specific to the customer;
   generating, at the server, a mobile device token to uniquely identify the mobile device and the customer;
   sending, from the server, the mobile device token to the mobile device for use with custom transactions at the self-service checkout;
   receiving, at the server, a transaction token for a transaction that has yet to commence on the self-service checkout and the mobile device token from the mobile device of the customer, wherein the self-service checkout continues to perform existing transactions that have not yet completed while the self-service checkout waits for identification of the customer from the server, the existing transactions including administrative operations and transactions unrelated to the transaction and the customer;
   acquiring, at the server, the customer profile data; and
   sending, from the server, the customer profile data to the self-service checkout to customize the transaction at the self-service checkout according to the customer profile data when the customer is identified at the self-service checkout and interacts with the self-service checkout using the mobile device to commence the transaction.

2. The method of claim 1 further comprising:
   receiving, at the server, a transaction request from the self-service checkout;
   producing, at the server, the transaction token; and
   sending, from the server, the transaction token to the self-service checkout.

3. The method of claim 1, wherein receiving the customer identifier further includes acquiring the customer identifier and the mobile device identifier from a retail loyalty service of a retailer.

4. The method of claim 1, wherein receiving the customer identifier further includes acquiring the customer identifier and the mobile device identifier from a website interface operated by the customer.

5. The method of claim 1, wherein receiving the customer identifier further includes acquiring the customer identifier and the mobile device identifier from a mobile app processing on the mobile device.

6. The method of claim 1, wherein obtaining the customer profile data further includes acquiring the customer profile data from a retail loyalty service of a retailer.

7. The method of claim 1, wherein obtaining the customer profile data further includes acquiring the customer profile data from a website interface operated by the customer.

8. The method of claim 1, wherein obtaining the customer profile data further includes acquiring the customer profile data from a mobile app processed on the mobile device.

9. The method of claim 1, wherein sending the mobile device token to the mobile device for use with custom transactions at the self-service checkout further includes pushing a mobile app for installation on the mobile device before the mobile device token is supplied.

10. The method of claim 9, wherein pushing the mobile app further includes sending the mobile device token to the mobile device at the request of the mobile app once the mobile app is up and running on the mobile device, the mobile app managing the mobile device token on the mobile device.

11. A processor-implemented method programmed in a non-transitory processor-readable medium and to execute on one or more processors of a mobile device configured to execute the method, comprising:
- acquiring, at the mobile device, a transaction token from a self-service checkout for a transaction that has yet to commence on the self-service checkout;
- sending, from the mobile device, the transaction token and a mobile device token to a preference configuring service, wherein the self-service checkout continues to perform existing transactions at that have not yet completed while the self-service checkout waits for identification of the customer from the preference configuring service after receiving the transaction token and the mobile device token, the existing transactions including administrative operations and transactions unrelated to the transaction and the customer;
- interacting, via the mobile device, with the self-service checkout to commence the transaction in accordance with a customer profile data; and
- receiving, at the mobile device, confirmation from the self-service checkout that the customer is identified, wherein the customer profile data is configured into the self-service checkout for proceeding with customizing the transaction after said interacting according to the customer profile data, the customer profile data specific to the customer and retrieved using the mobile device token, and wherein the customer profile data includes features for the self-service checkout and the features include text size, spoken language, and voice prompts.

12. The method of claim 11, wherein acquiring the transaction token further includes activating a camera of the mobile device to scan the transaction token from a display of the self-service checkout as a barcode or a quick response (QR) code.

13. The method of claim 11, wherein acquiring the transaction token further includes activating a near field communication device of the mobile device to acquire the transaction token from the self-service checkout, via a tap of the mobile device to the self-service checkout.

14. The method of claim 11, wherein sending the transaction token and the mobile device token to the preference configuring service further includes digitally signing the transaction token with a key associated with a retailer, the self-service checkout, the customer, the mobile device, and/or the preference configuring service before sending the signed transaction token to the preference configuring service.

15. A processor-implemented method programmed in a non-transitory processor-readable medium and to execute on one or more processors of a self-service checkout configured to execute the method, comprising:
- obtaining, at the self-service checkout, a transaction token for a transaction that has yet to commence on the self-service checkout with an unknown customer;
- receiving, at the self-service checkout, the transaction token;
- making, at the self-service checkout, the transaction token available to a mobile device of the unknown customer;
- performing existing transactions, at the self-service checkout, that have not yet completed while the self-service checkout waits for identification of the unknown customer after the transaction token is sent with a mobile device token from the mobile device to a preference configuring service, wherein the existing transactions include administrative operations and transactions unrelated to the transaction and the customer;
- acquiring, at the self-service checkout, customer profile data for a known customer, the customer profile data received from the preference configuring service based on the mobile device token sent from the mobile device tied to the unknown customer but recognized as the known customer, the customer profile data specific to the known customer;
- interacting, via the self-service checkout, with the mobile device of the known customer to commence the transaction; and
- configuring, via the self-service checkout, features of the self-service checkout for customizing the transaction in accordance with the customer profile data after said interacting, wherein the features include text size, spoken language, and voice prompts.

16. The method of claim 15, wherein making the transaction token available further includes displaying the transaction token as a bar code or quick response (QR) code on an attraction screen of the self-service checkout for the mobile device to scan and send to the preference configuring service.

17. The method of claim 15, wherein making the transaction token available further includes communicating the transaction token as near field communication data from a near field communication device of the self-service checkout to a mobile device near field communication device of the mobile device.

* * * * *